US012645505B2

(12) United States Patent
Kwon et al.

(10) Patent No.: US 12,645,505 B2
(45) Date of Patent: Jun. 2, 2026

(54) APPARATUS AND METHOD WITH COMPUTING SYSTEM CONTROL BASED ON REINFORCEMENT LEARNING FOR OPERATING IN HIGH PERFORMANCE / EFFICIENCY MODE

(71) Applicant: SAMSUNG ELECTRONICS CO., LTD., Suwon-si (KR)

(72) Inventors: Hyung-Dal Kwon, Suwon-si (KR); Seongbeom Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 629 days.

(21) Appl. No.: 18/102,963

(22) Filed: Jan. 30, 2023

(65) Prior Publication Data

US 2024/0054024 A1 Feb. 15, 2024

(30) Foreign Application Priority Data

Aug. 12, 2022 (KR) ........................ 10-2022-0101576

(51) Int. Cl.
G06F 9/50 (2006.01)
G06F 1/20 (2006.01)
(Continued)

(52) U.S. Cl.
CPC ............ G06F 9/5094 (2013.01); G06F 1/206 (2013.01); G06F 1/3206 (2013.01); G06F 1/324 (2013.01);
(Continued)

(58) Field of Classification Search
None
See application file for complete search history.

(56) References Cited

U.S. PATENT DOCUMENTS 8,473,724 B1 * 6/2013 Kenville ............... G06F 9/3808
712/229
2008/0313640 A1 * 12/2008 Liu ........................ G06F 1/3203
713/320
(Continued)

FOREIGN PATENT DOCUMENTS

KR 10-2021-0101337 A 8/2021
KR 10-2023-0047872 A 4/2023
(Continued)

OTHER PUBLICATIONS

Extended European search report issued on Jan. 5, 2024, in counterpart European Patent Application No. 23179512.1 (12 pages).
(Continued)

*Primary Examiner* — Abu Zar Ghaffari
(74) *Attorney, Agent, or Firm* — NSIP Law

(57) ABSTRACT

An apparatus with computing system control includes: a receiver configured to receive an operation mode for controlling a plurality of components constituting a computing system; and a processor configured to: determine a parameter for controlling the plurality of components based on the operation mode, a time limit for processing an operation of the plurality of components, and an operation time of the plurality of components; distribute a workload for the plurality of components based on the parameter; and process the operation based on the distributed workload.

25 Claims, 12 Drawing Sheets

(51) Int. Cl.

| | |
|---|---|
| *G06F 1/32* | (2019.01) |
| *G06F 1/3206* | (2019.01) |
| *G06F 1/324* | (2019.01) |
| *G06F 1/329* | (2019.01) |
| *G06F 1/3296* | (2019.01) |
| *G06F 9/30* | (2018.01) |
| *G06F 9/48* | (2006.01) |
| *G06N 3/092* | (2023.01) |
| *G06F 9/455* | (2018.01) |

(52) U.S. Cl.
CPC ............ *G06F 1/329* (2013.01); *G06F 1/3296* (2013.01); *G06F 9/30189* (2013.01); *G06F 9/4837* (2013.01); *G06F 9/505* (2013.01); *G06F 9/5072* (2013.01); *G06F 9/5083* (2013.01); *G06N 3/092* (2023.01); *G06F 9/45558* (2013.01); *G06F 2009/4557* (2013.01); *G06F 9/5027* (2013.01); *G06F 9/5077* (2013.01); *G06F 2209/501* (2013.01); *Y02D 10/00* (2018.01)

(56) References Cited

U.S. PATENT DOCUMENTS

| | | | | |
|---|---|---|---|---|
| 2009/0144568 | A1* | 6/2009 | Fung ........................ | G06F 1/324 713/300 |
| 2011/0022870 | A1* | 1/2011 | McGrane ............ | G06F 11/3433 713/340 |
| 2014/0115363 | A1* | 4/2014 | Tu ......................... | G06F 1/3293 713/323 |
| 2014/0215241 | A1* | 7/2014 | Yoon ..................... | G06F 1/3275 713/320 |
| 2014/0281647 | A1* | 9/2014 | Bodas ................... | G06F 1/3206 713/340 |
| 2016/0239065 | A1* | 8/2016 | Lee ........................ | G06F 1/3296 |
| 2017/0322616 | A1 | 11/2017 | Hsiao et al. | |
| 2018/0024860 | A1* | 1/2018 | Balle ..................... | G06F 3/0625 |
| 2018/0095520 | A1* | 4/2018 | Rajwan ..................... | G06F 1/28 |
| 2018/0373287 | A1* | 12/2018 | Al-Rawi ................ | G06F 9/505 |
| 2019/0265777 | A1* | 8/2019 | Lee ............................ | G06F 9/50 |
| 2019/0370086 | A1 | 12/2019 | Heilper et al. | |
| 2020/0050920 | A1 | 2/2020 | Idgunji et al. | |
| 2020/0301860 | A1 | 9/2020 | Hsu et al. | |
| 2021/0081027 | A1 | 3/2021 | Park et al. | |
| 2021/0081209 | A1 | 3/2021 | Meswani et al. | |
| 2022/0091653 | A1* | 3/2022 | Subramony .............. | G06F 1/28 |
| 2023/0217253 | A1* | 7/2023 | Palermo ............. | H04W 12/125 726/23 |
| 2023/0305905 | A1* | 9/2023 | Chen ..................... | G06F 9/5038 |

FOREIGN PATENT DOCUMENTS

| | | |
|---|---|---|
| WO | WO 2005/098579 A2 | 10/2005 |
| WO | WO 2014/065970 A1 | 5/2014 |

OTHER PUBLICATIONS

Gocht, Andreas, et al. "Q-learning inspired self-tuning for energy efficiency in hpc." *2019 International Conference on High Performance Computing & Simulation (HPCS)*. IEEE, (2019). pp. 1-4.

Tang, Zhenheng, et al. "The impact of GPU DVFS on the energy and performance of deep learning: An empirical study." *Proceedings of the Tenth ACM International Conference on Future Energy Systems*. (2019). pp. 1-12.

* cited by examiner

APPARATUS AND METHOD WITH COMPUTING SYSTEM CONTROL BASED ON REINFORCEMENT LEARNING FOR OPERATING IN HIGH PERFORMANCE / EFFICIENCY MODE

CROSS-REFERENCE TO RELATED APPLICATIONS

This application claims the benefit under 35 USC § 119(a) of Korean Patent Application No. 10-2022-0101576, filed on Aug. 12, 2022 in the Korean Intellectual Property Office, the entire disclosure of which is incorporated herein by reference for all purposes.

BACKGROUND

1. Field

The following description relates to an apparatus and method with computing system control.

2. Description of Related Art

To enhance the performance of a computing system or reduce power consumption, dynamic voltage and frequency scaling (DVFS) technology may adjust a voltage and a frequency of the computing system.

DVFS is a power saving technology in computer architecture and may refer to technology for controlling the performance and power by dynamically increasing or reducing a voltage applied to a used component and by adjusting a core frequency.

Since it is impossible to reflect power characteristics of various components constituting a computing system in a related art, a power efficiency in the related art may be low, and it may be difficult for the related art to control the performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus with computing system control includes: a receiver configured to receive an operation mode for controlling a plurality of components constituting a computing system; and a processor configured to: determine a parameter for controlling the plurality of components based on the operation mode, a time limit for processing an operation of the plurality of components, and an operation time of the plurality of components; distribute a workload for the plurality of components based on the parameter; and process the operation based on the distributed workload.

For the determining of the parameter, the processor may be configured to: determine the parameter for controlling the plurality of components based on the operation mode being a high performance mode; and determine the parameter for controlling the plurality of components based on the operation mode being a high efficiency mode.

The plurality of components may include any one or any combination of any two or more of an operation component, a storage component, a communication component, and a power component.

For the determining of the parameter, the processor may be configured to determine either one or both of an operation voltage and an operation frequency for controlling the plurality of components based on the operation mode, the time limit for processing the operation, and the operation time of the plurality of components.

For the determining of the parameter, the processor may be configured to determine the parameter based on power consumed by the plurality of components, performances of the plurality of components, and temperatures of the plurality of components.

For the distributing of the workload, the processor may be configured to, in response to the operation mode being a high performance mode: compare power consumptions of the plurality of components; and assign different workloads to the plurality of components based on a comparison result of the power consumption.

For the receiving of the operation mode, the receiver may be configured to receive a command to change the operation mode from a user of the computing system in real time, and for the determining of the parameter, the processor may be configured to perform either one of: changing an operation mode of a portion of the plurality of components in response to the command; and automatically changing an operation mode of a portion of the plurality of components based on a predetermined value.

The plurality of components may include a first component and a second component, the different workloads may include a first workload and a second workload having an amount of computation greater than an amount of computation of the first workload, and for the assigning of the different workloads, the processor may be configured to, in response to power consumption of the first component being greater than power consumption of the second component: assign the first workload to the first component; and assign the second workload to the second component.

For the distributing of the workload, the processor may be configured to, in response to the operation mode being a high efficiency mode: compare operation voltages according to operation frequencies of the plurality of components; and assign different workloads to the plurality of components based on a comparison result of the operation voltages.

The plurality of components may include a first component and a second component, the different workloads may include a first workload, and a second workload with an amount of computation greater than an amount of computation of the first workload, and for the assigning of the different workloads, the processor may be configured to, in response to an operation voltage of the first component being less than an operation voltage of the second component at a same operation frequency: assign the second workload to the first component; and assign the first workload to the second component.

The distributed workload may include a first workload, and a second workload with an amount of computation greater than an amount of computation of the first workload, and for the distributing of the workload, the processor may be configured to: generate a first cluster and a second cluster by clustering the plurality of components based on dynamic voltage and frequency scaling (DVFS) characteristics of the plurality of components; assign the second workload to a cluster excellent in the DVFS characteristics among the first cluster and the second cluster; and assign the first workload to the other cluster.

For the determining of the parameter, the processor may be configured to determine the parameter by performing reinforcement learning on a neural network based on temperatures of the plurality of components, operation voltages of the plurality of components, operation frequencies of the plurality of components, power consumption of the plurality of components, peak performances of the plurality of components, and power efficiencies of the plurality of components.

In another general aspect, a processor-implemented method with computing system control may include: receiving an operation mode for controlling a plurality of components constituting a computing system; determining a parameter for controlling the plurality of components based on the operation mode, a time limit for processing an operation of the plurality of components, and an operation time of the plurality of components; distributing a workload for the plurality of components based on the parameter; and processing the operation based on the distributed workload.

The determining of the parameter may include selectively, based on the received operation mode: determining the parameter for controlling the plurality of components based on the operation mode being a high performance mode; and determining the parameter for controlling the plurality of components based on the operation mode being a high efficiency mode.

The plurality of components may include any one or any combination of any two or more of an operation component, a storage component, a communication component, and a power component.

The determining of the parameter may include determining either one or both of an operation voltage and an operation frequency for controlling the plurality of components based on the operation mode, the time limit for processing the operation, and the operation time of the plurality of components.

The determining of the parameter may include determining the parameter based on power consumed by the plurality of components, performances of the plurality of components, and temperatures of the plurality of components.

The distributing of the workload may include, in response to the operation mode being a high performance mode: comparing power consumptions of the plurality of components; and assigning different workloads to the plurality of components based on a result of the comparing.

The receiving of the operation mode may include receiving a command to change the operation mode from a user of the computing system in real time, and the determining of the parameter may include either one of: changing an operation mode of a portion of the plurality of components in response to the command; and automatically changing an operation mode of a portion of the plurality of components based on a predetermined value.

The plurality of components may include a first component and a second component, the different workloads may include a first workload, and a second workload having an amount of computation greater than an amount of computation of the first workload, and the assigning of the different workloads to the plurality of components may include, in response to power consumption of the first component being greater than power consumption of the second component: assigning the first workload to the first component; and assigning the second workload to the second component.

The distributing of the workload may include, in response to the operation mode being a high efficiency mode: comparing operation voltages according to operation frequencies of the plurality of components; and assigning different workloads to the plurality of components based on a result of the comparing.

The plurality of components may include a first component and a second component, the different workloads may include a first workload, and a second workload having an amount of computation greater than an amount of computation of the first workload, and the assigning of the different workloads to the plurality of components may include, in response to an operation voltage of the first component being less than an operation voltage of the second component at a same operation frequency: assigning the second workload to the first component; and assigning the first workload to the second component.

The distributed workload may include a first workload, and a second workload with an amount of computation greater than an amount of computation of the first workload, and the distributing of the workload may include: generating a first cluster and a second cluster by clustering the plurality of components based on dynamic voltage and frequency scaling (DVFS) characteristics of the plurality of components; assigning the second workload to a cluster excellent in the DVFS characteristics among the first cluster and the second cluster; and assigning the first workload to the other cluster.

The determining of the parameter may include determining the parameter by performing reinforcement learning on a neural network based on temperatures of the plurality of components, operation voltages of the plurality of components, operation frequencies of the plurality of components, power consumption of the plurality of components, peak performances of the plurality of components, and power efficiencies of the plurality of components.

In another general aspect, one or more embodiments include a non-transitory computer-readable storage medium storing instructions that, when executed by one or more processors, configure the one or more processors to perform any one, any combination, or all operations and methods described herein.

In another general aspect, a processor-implemented method with computing system control includes: determining a first operation parameter of a first component and a second operation parameter of a second component based on an operation mode for controlling a computing system comprising the first component and the second component; assigning a first workload to the first component and a second workload, having a greater amount of computation than the first workload, to the second component, in response to the first operation parameter being greater than the second operation parameter; and processing an operation using the first component and the second component based on the assigned first workload and the assigned second workload.

The determining of the first operation parameter and the second operation parameter may include: determining the first operation parameter and the second operation parameter to be power consumptions in response to the operation mode being a high performance mode; and determining the first operation parameter and the second operation parameter to be operation voltages in response to the operation mode being a high efficiency mode.

Other features and aspects will be apparent from the following detailed description, the drawings, and the claims.

5

6

Figure 3:
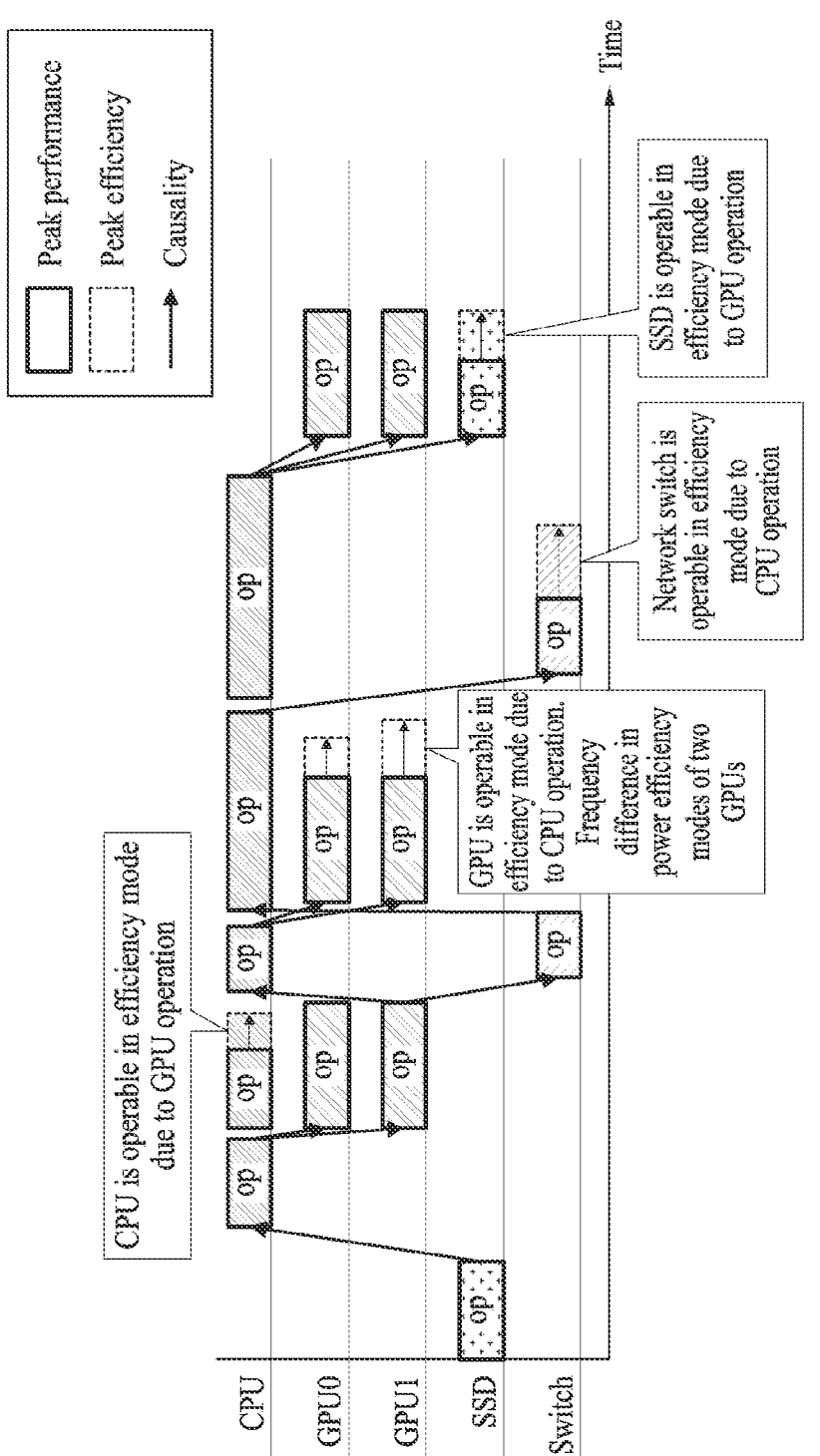

FIG. 3 illustrates an example of operations of a plurality of components in a high performance mode.

Figure 4:
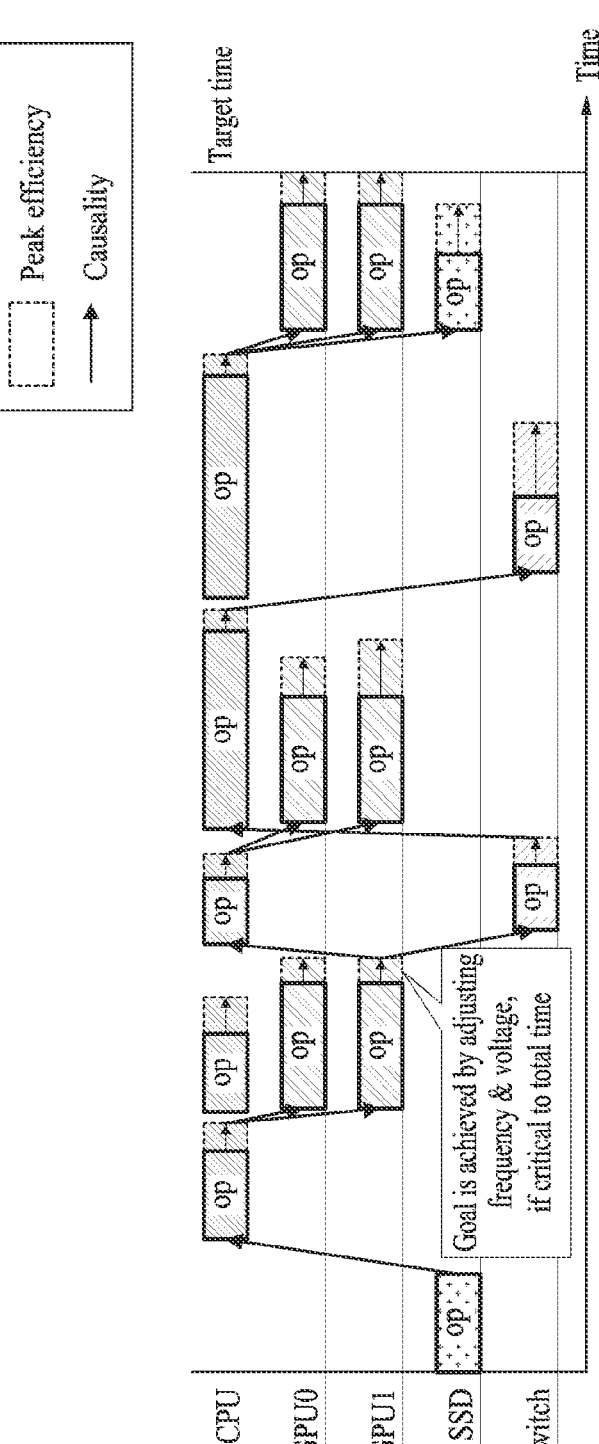

FIG. 4 illustrates an example of operations of a plurality of components in a high efficiency mode.

Figure 5:
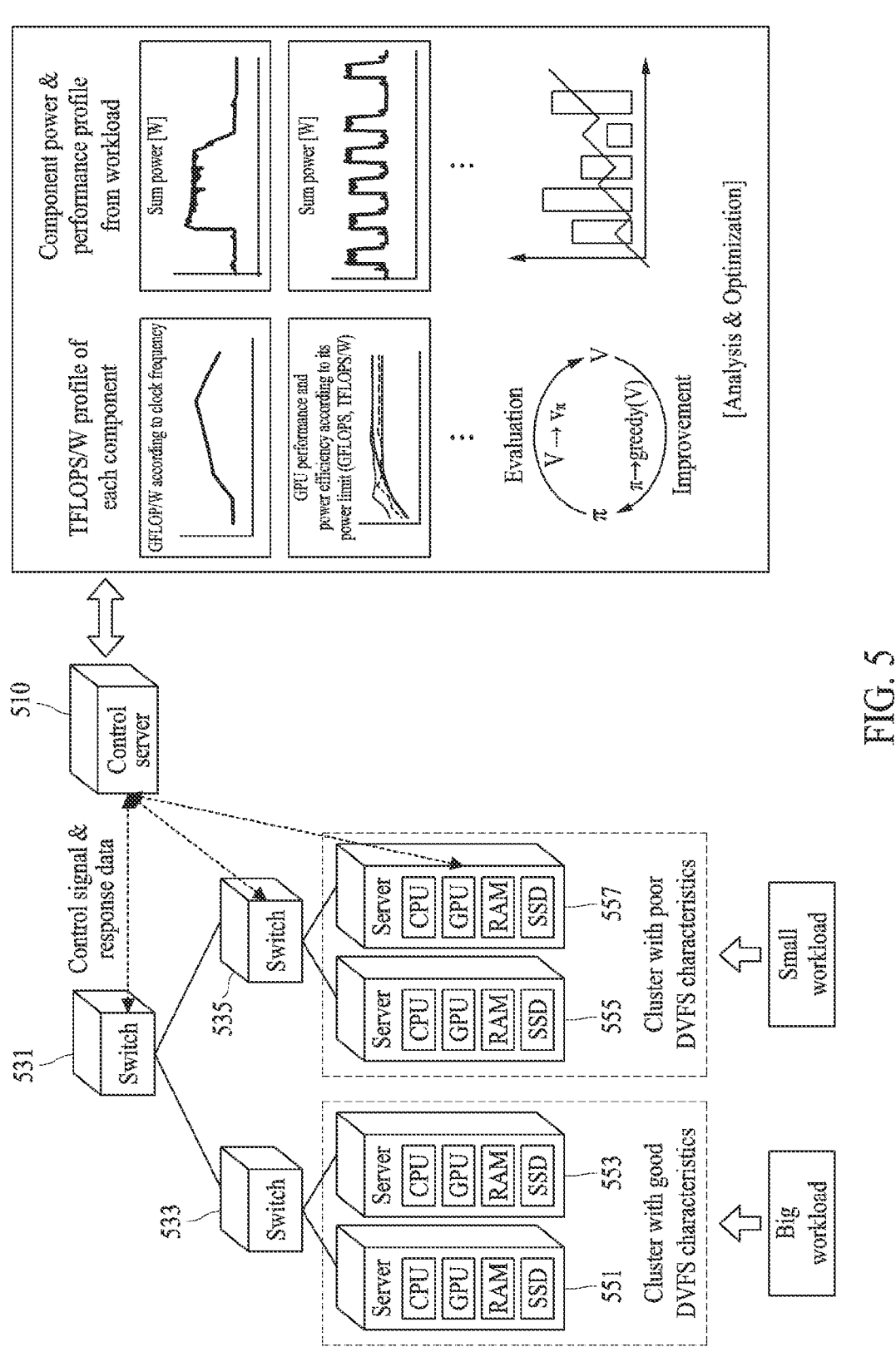

FIG. 5 illustrates an example of a computing system control method of a computing system control apparatus.

Figure 6:
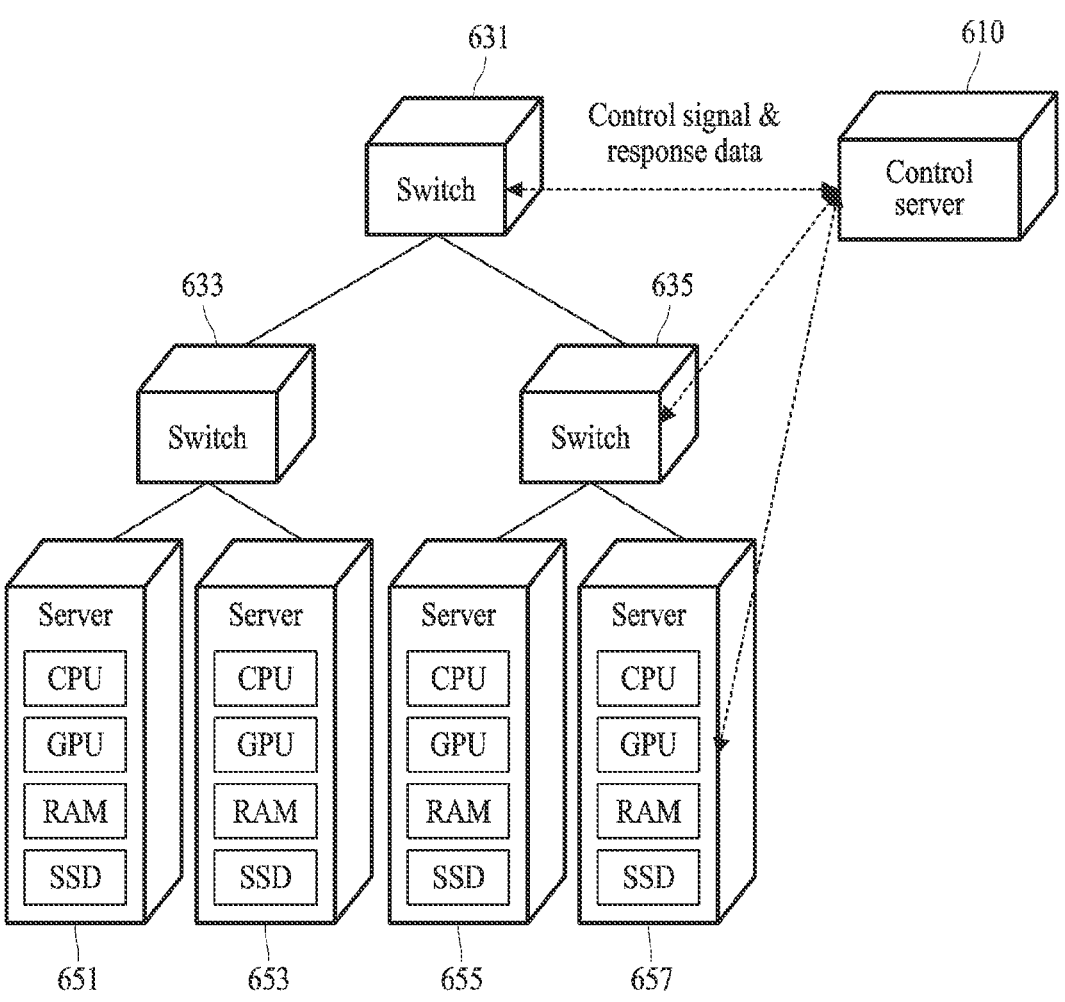

FIG. 6 illustrates an example of a computing system control method of a computing system control apparatus.

Figure 7:
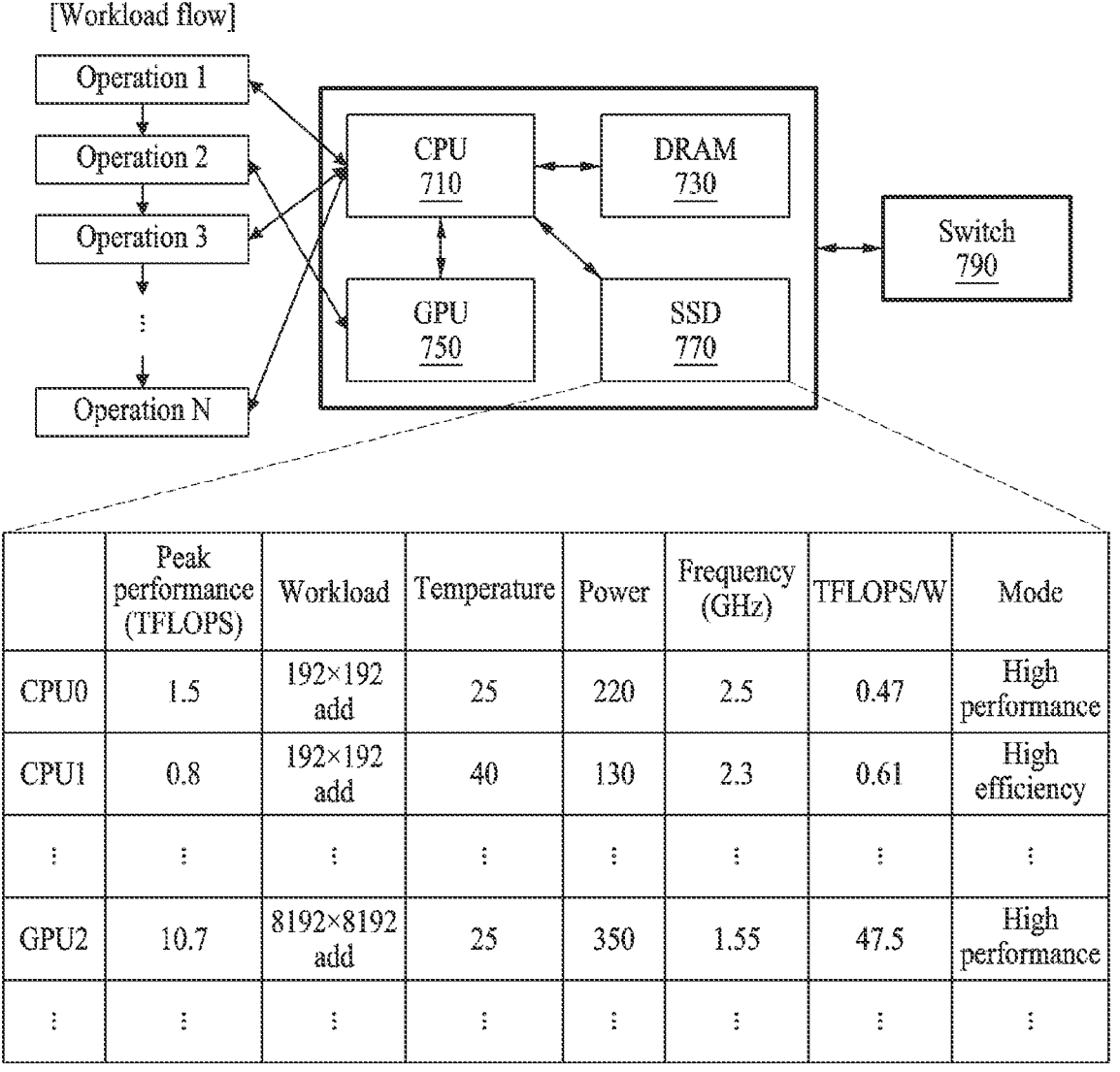

FIG. 7 illustrates an example of an operation of controlling a computing system based on a table including parameters.

Figure 8:
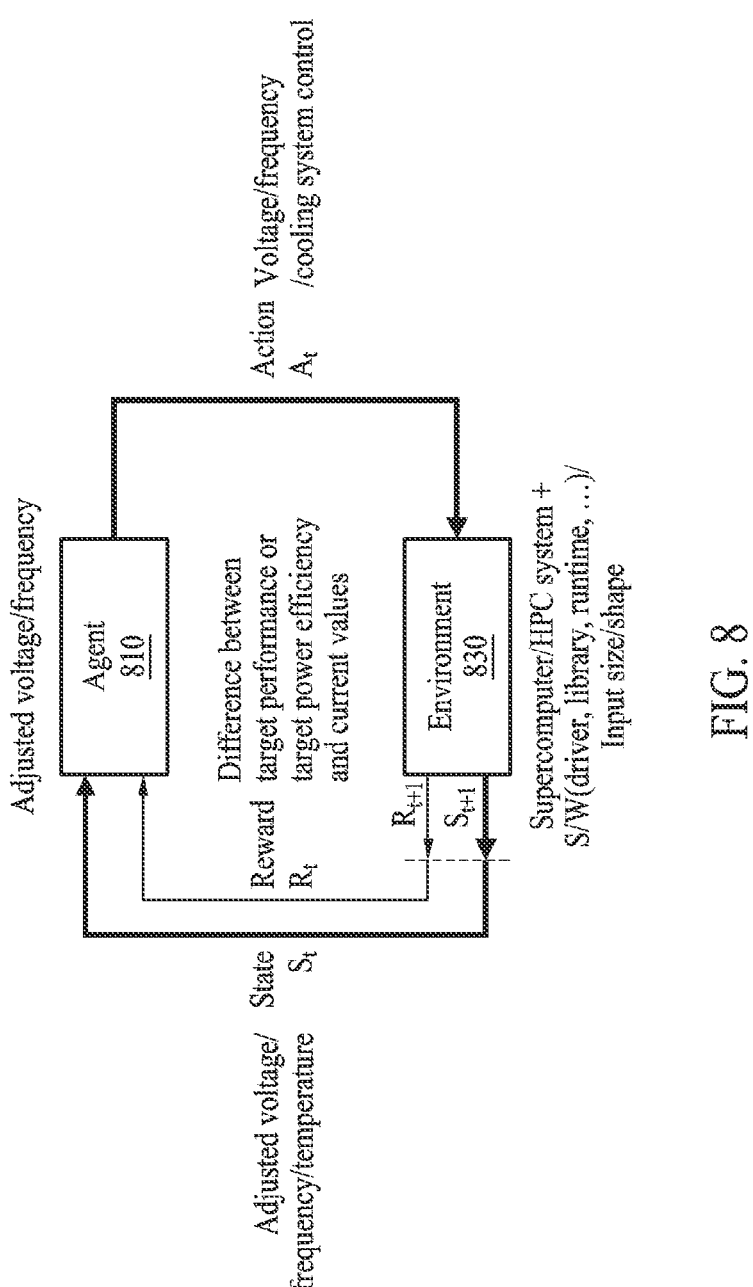

FIG. 8 illustrates an example of an operation of controlling a computing system based on reinforcement learning.

Figure 9A:
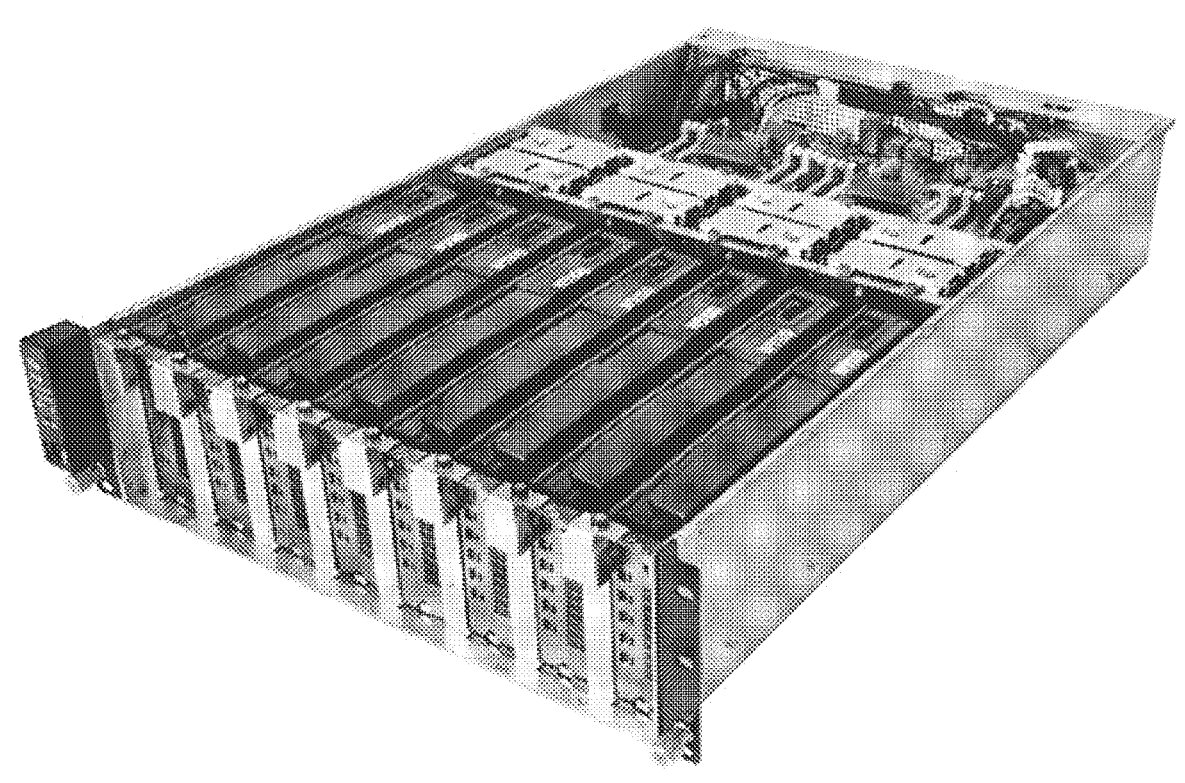
Figure 9B:
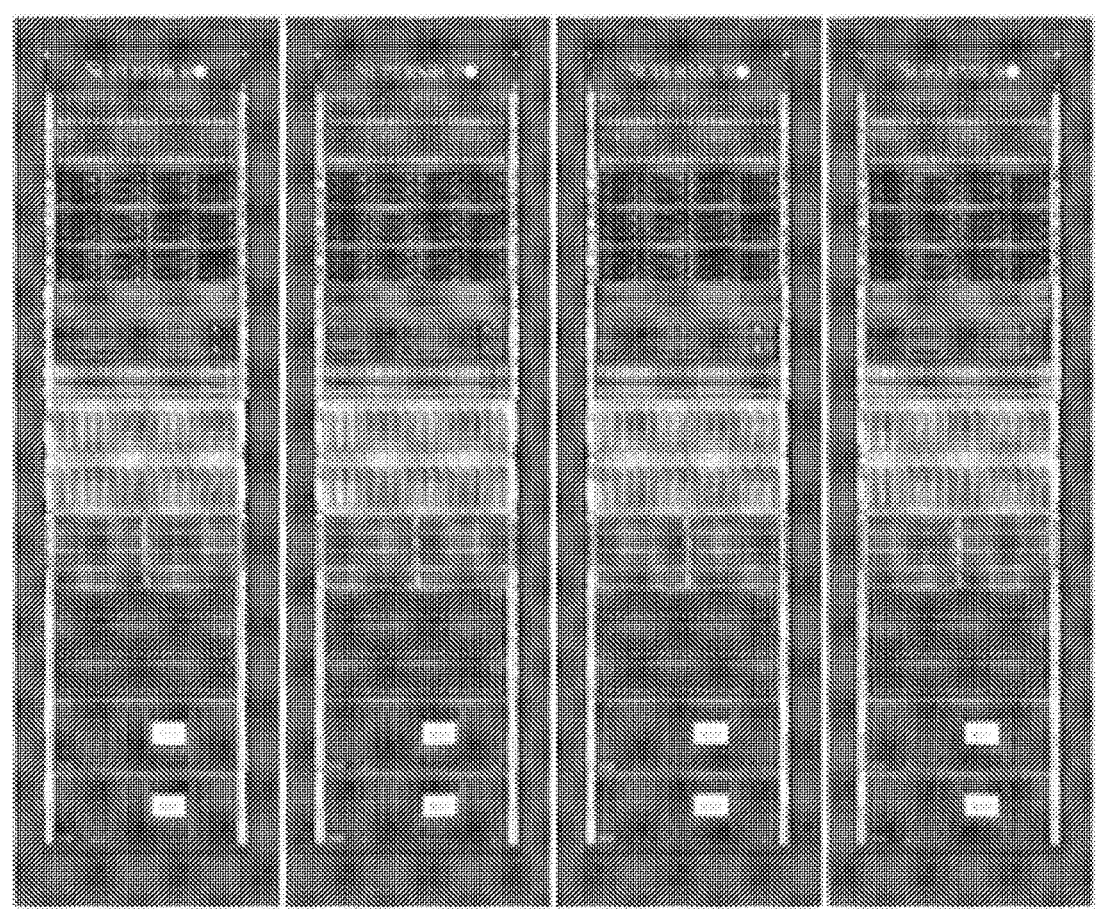
Figure 9C:
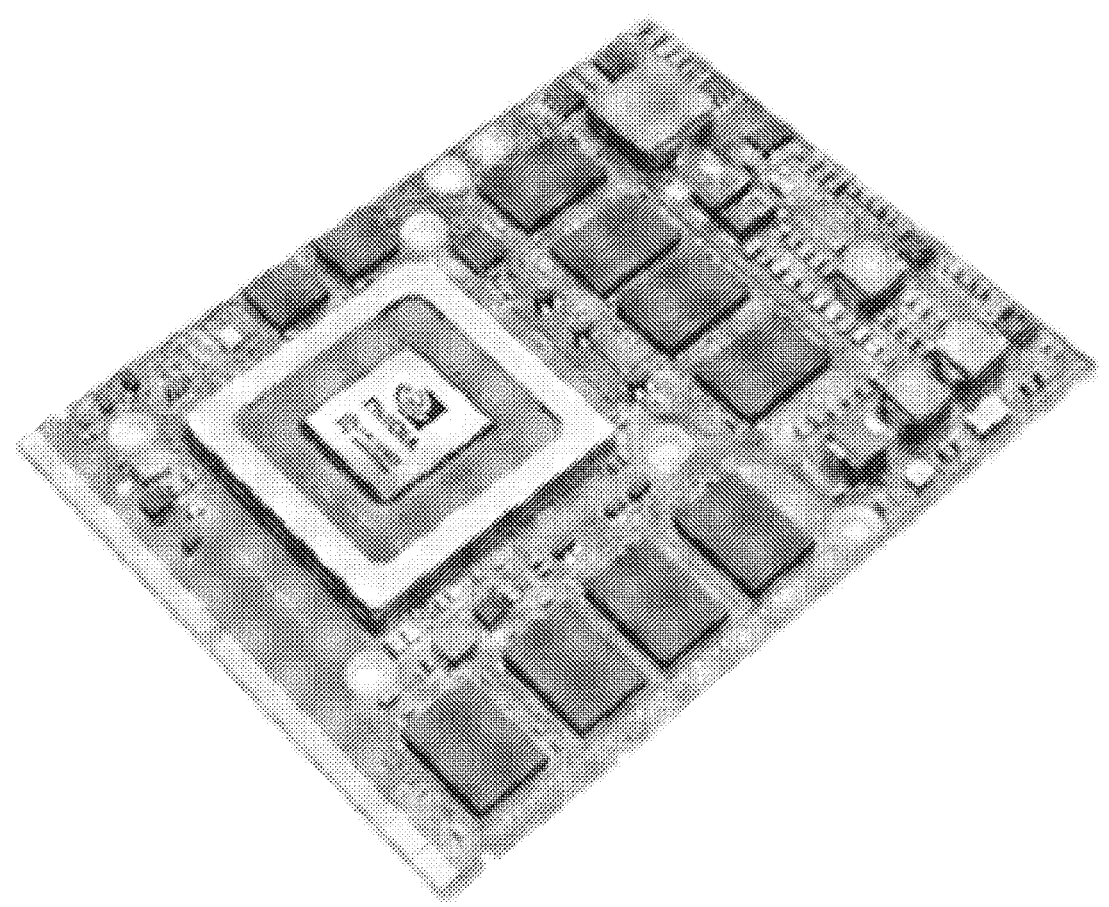

FIGS. 9A through 9C illustrate examples of hardware in which a computing system control apparatus may be implemented.

Figure 10:
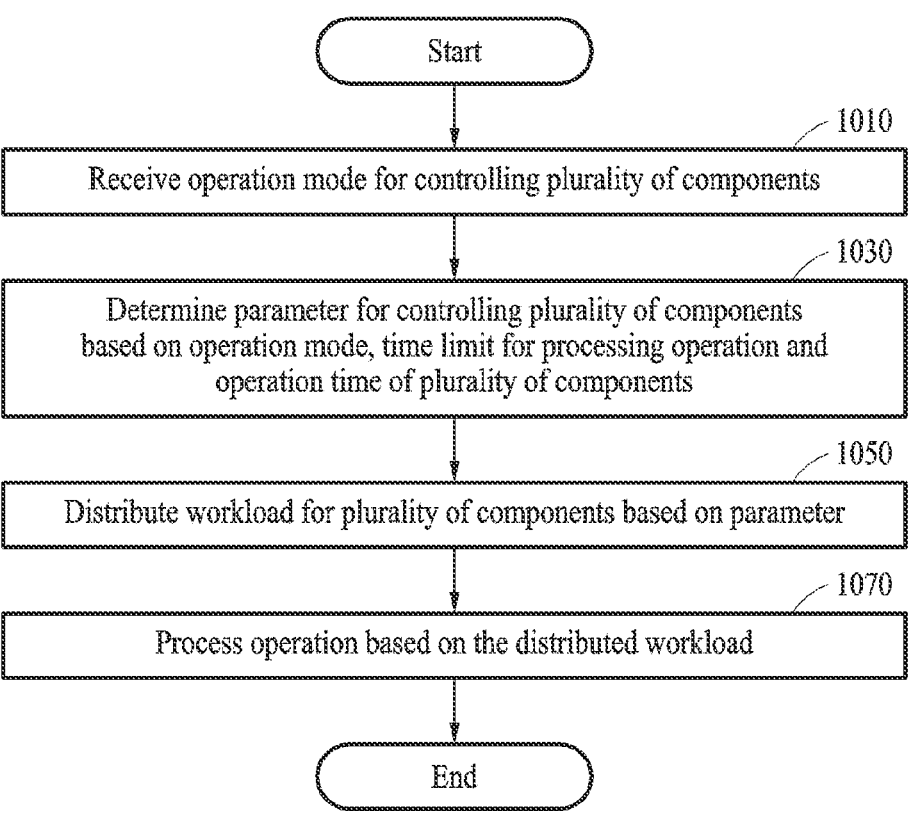

FIG. 10 illustrates an example of an operation of a computing system control apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, devices, and/or systems described herein. However, various changes, modifications, and equivalents of the methods, devices, and/or systems described herein will be apparent after an understanding of the disclosure of this application. For example, the sequences of operations described herein are merely examples, and are not limited to those set forth herein, but may be changed with the exception of operations necessarily occurring in a certain order. Also, descriptions of features that are known after understanding of the disclosure of this application may be omitted for increased clarity and conciseness.

Although terms of "first," "second," and "third" may be used to describe various components, members, regions, layers, or sections, these components, members, regions, layers, or sections are not to be limited by these terms (e.g., "first," "second," and "third"). Rather, these terms are only used to distinguish one component, member, region, layer, or section from another component, member, region, layer, or section. Thus, for example, a "first" component, member, region, layer, or section referred to in examples described herein may also be referred to as a "second" component, member, region, layer, or section, and a "second" component, member, region, layer, or section referred to in examples described herein may also be referred to as the "first" component without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween. Likewise, similar expressions, for example, "between" and "immediately between," and "adjacent to" and "immediately adjacent to," are also to be construed in the same.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, components, and/or combinations thereof, but do not preclude the presence or addition of one or more other features, integers, operations, operations, elements, components and/or combinations thereof. As used herein, the term "and/or" includes any one and any combination of any two or more of the associated listed items. The use of the term "may" herein with respect to an example or embodiment (for example, as to what an example or embodiment may include or implement) means that one or more examples or embodiments exists where such a feature is included or implemented, while all examples are not limited thereto.

Unless otherwise defined, all terms, including technical and scientific terms, used herein have the same meaning as commonly understood consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

The term "unit" used herein refers to a software component or a hardware component such as a field-programmable gate array (FPGA) or an ASIC, which performs predetermined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the examples will be described in detail with reference to the accompanying drawings. When describing the examples with reference to the accompanying drawings, like reference numerals refer to like elements and any repeated description related thereto will be omitted.

Figure 1:
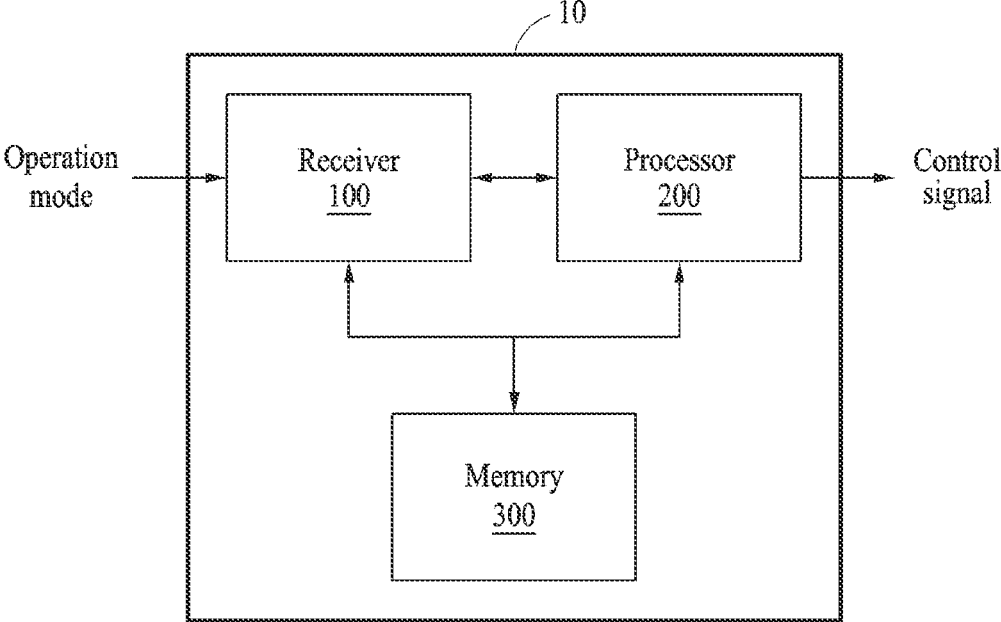
FIG. 1 illustrates an example of a computing system control apparatus.

FIG. 1 illustrates an example of a computing system control apparatus.

Referring to FIG. 1, a computing system control apparatus 10 may control a computing system. Computing may refer to an operation of performing development and calculation using a computer to achieve one or more purposes. The computing system may be a system (software) that includes all resources (e.g., hardware resources) for performing computing, such as hardware, software, data and/or networks, and functions of input, output, processing and/or storage devices.

The computing system control apparatus 10 may be or be included in a personal computer (PC), a data server, and/or a portable device.

The portable device may be implemented as, for example, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book, and/or a smart device. The smart device may be implemented as, for example, a smartwatch, a smart band, and/or a smart ring.

The computing system control apparatus 10 may include a plurality of components. The plurality of components may include an operation component, a storage component, a communication component, and/or a power component.

The operation component may be or include various types of a processor 200 (e.g., one or more processors). The operation component may include, for example, a CPU, a graphics processing unit (GPU), a neural processing unit (NPU), a tensor processing unit (TPU), and/or an FPGA.

The storage component may include a device for storing data. The storage component may be or include a memory 300 (e.g., one or more memories). The storage component included in the plurality of components may include a storage of a host, a main memory, and a main memory or a flash memory in the operation component.

The memory 300 may store data for an operation or an operation result. The memory 300 may store instructions (or programs) executable by the processor 200. For example, the instructions may include instructions for executing an operation of the processor 200 and/or instructions for performing an operation of each component of the processor 200. The memory 300 may include a non-transitory computer-readable storage medium storing instructions that, when executed by the processor 200, configure the processor 200 to perform any one, any combination, or all of the operations and methods described herein with reference to FIGS. 1-10.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), and/or a twin transistor RAM (TTRAM).

The non-volatile memory device may be implemented as an electrically erasable programmable read-only memory (EEPROM), a flash memory, a magnetic RAM (M RAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device, and/or an insulator resistance change memory.

The communication component may include a device for performing communication. For example, the communication component may include a network switch and/or a network interface card (NIC).

The power component may include a device for supplying power to other components.

The computing system control apparatus 10 may include a receiver 100, the processor 200, and/or the memory 300.

The receiver 100 may receive an operation mode for controlling a plurality of components constituting the computing system. The operation mode may include a high performance mode and/or a high efficiency mode. The receiver 100 may receive a command to change the operation mode from a user of the computing system in real time. The receiver 100 may receive predetermined data to change the operation mode.

The operation mode may include an electrical signal. The operation mode may be determined by the processor 200 and transmitted to the receiver 100 or received from the outside. The receiver 100 may include a reception interface. The receiver 100 may output the operation mode to the processor 200.

The processor 200 may process data stored in the memory 300. The processor 200 may execute a computer-readable code (e.g., software) stored in the memory 300 and instructions triggered by the processor 200.

The processor 200 may be a hardware-implemented data processing device having a circuit that is physically structured to execute desired operations. The desired operations may include, for example, codes or instructions included in a program.

The hardware-implemented data processing device may include, for example, a microprocessor, a CPU, a processor core, a multi-core processor, a multiprocessor, an ASIC, and an FPGA.

The processor 200 may determine a parameter for controlling the plurality of components, based on the operation mode, a time limit for processing an operation, and/or an operation time of the plurality of components.

The processor 200 may determine, as the parameter, an operation voltage and/or an operation frequency for controlling the plurality of components based on the operation mode, the time limit for processing the operation, and/or the operation time of the plurality of components. The operation frequency may include a clock frequency.

The processor 200 may determine the parameter (e.g., the operation voltage and/or the operation frequency) based on power consumed by the plurality of components, performance of the plurality of components, and/or temperatures of the plurality of components.

The performance of the plurality of components may be different depending on a type of component. A performance of the operation component may include an operation processing speed of the operation component. For example, a processing speed may have a unit of floating-point operations per second (FLOPS). A performance of the storage component may include a storage capacity or a bandwidth for a data transmission of the storage component. A performance of the power component may include power that may be supplied by the power component.

The processor 200 may determine the parameter (e.g., the operation voltage and/or the operation frequency) by performing reinforcement learning on a neural network based on the temperatures of the plurality of components, operation voltages of the plurality of components, operation frequencies of the plurality of components, power consumption of the plurality of components, peak performance of the plurality of components, and/or power efficiencies of the plurality of components.

The neural network may generally refer to a model having a problem-solving ability implemented through nodes forming a network through synaptic connections where a strength of the synaptic connections is changed through learning.

A node of the neural network may include a combination of weights or biases. The neural network may include one or more layers, each including one or more nodes. The neural network may infer a result from a predetermined input by changing weights of the nodes through training.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN).

The processor 200 may distribute a workload for the plurality of components based on the parameter. The workload may include the amount and/or nature of a task that is to be processed by the computing system within a provided period of time.

The processor 200 may change an operation mode of a portion of the plurality of components in response to a command received from the user. Alternatively or additionally, the processor 200 may automatically change an operation mode of a portion of the plurality of components based on a predetermined value. The processor 200 may provide the user of the computing system with information for a change in the operation mode in real time.

For the distributing of the workload when the operation mode is the high performance mode, the processor 200 may compare power consumption of the plurality of components, and the processor 200 may assign different workloads to the plurality of components based on a result of the comparing of the power consumption.

The plurality of components may include a first component and a second component. The different workloads or the distributed workload may include a first workload, and a second workload with an amount of computation greater than that of the first workload.

For example, when power consumption of the first component is greater than that of the second component, the processor 200 may assign the first workload to the first component and the processor 200 may assign the second workload to the second component.

For the distributing of the workload when the operation mode is the high efficiency mode, the processor 200 may compare operation voltages according to operation frequencies of the plurality of components, and the processor 200 may assign different workloads to the plurality of components based on a result of the comparing of the operation voltages.

For example, when an operation voltage of the first component is less than that of the second component at the same operation frequency, the processor 200 may assign the second workload to the first component and the processor 200 may assign the first workload to the second component.

The processor 200 may generate a first cluster and a second cluster by clustering the plurality of components based on dynamic voltage and frequency scaling (DVFS) characteristics of the plurality of components. A cluster may be a set of components including a plurality of components.

For the distributing of the workload, the processor 200 may assign the second workload to a cluster excellent in DVFS characteristics among the first cluster and the second cluster, and the processor 200 may assign the first workload to the other cluster.

The processor 200 may process an operation based on the distributed workload.

Hereinafter, examples of controlling the computing system will be described in detail with reference to FIGS. 2 through 7.

Figure 2:
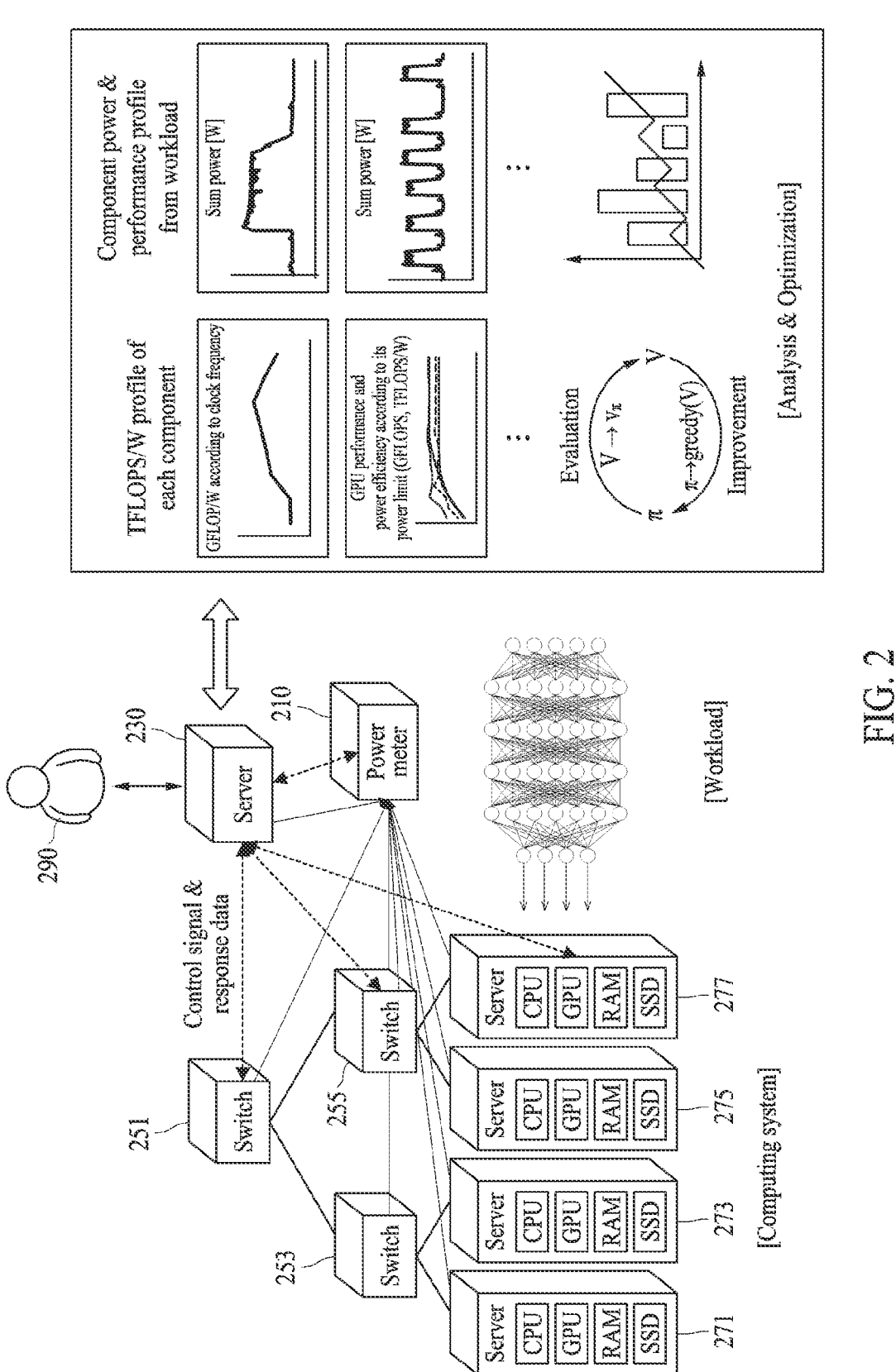
FIG. 2 illustrates an example of a computing system control method of a computing system control apparatus.

FIG. 2 illustrates an example of a computing system control method of a computing system control apparatus (e.g., the computing system control apparatus 10 of FIG. 1), FIG. 3 illustrates an example of operations of the plurality of components in a high performance mode, and FIG. 4 illustrates an example of operations of the plurality of components in a high efficiency mode.

Referring to FIGS. 2 through 4, a computing system control apparatus (e.g., the computing system control apparatus 10 of FIG. 1) may control a computing system. The computing system may include one or more operation components (e.g., a CPU, a GPU, or an FPGA), a storage component (e.g., a solid-state drive (SSD) or a hard disk drive (HDD)), one or more communication components (e.g., a network switch), and one or more power components (e.g., a power distribution unit (PDU) or a power supply unit (PSU)).

Each of the components may be a single component or may include a plurality of sub-components. Each of the components may have its own DVFS characteristics due to a deviation caused by a manufacturing process. A processor (e.g., the processor 200 of FIG. 1) may reduce power consumption while achieving the maximum performance in the computing system, by analyzing unique characteristics of the respective components of the computing system and efficiently using the analyzed characteristics. In addition, the processor 200 may maximize a power efficiency of the computing system.

The processor 200 may measure a unique DVFS characteristic while adjusting a power value of each of the components. In the example of FIG. 3, the computing system may include a plurality of servers 230, 271, 273, 275, and 277, and a plurality of switches 251, 253, and 255 as components.

In the example of FIG. 2, the processor 200 may be implemented in the server 230. According to an example, the processor 200 may also be implemented in another server.

The processor 200 may receive a command from a user 290. The processor 200 may receive a command to change an operation mode from the user 290 in real time. The processor 200 may provide information for changing the operation mode to the user 290 in real time.

The processor 200 may change an operation mode of a portion of the plurality of components in response to the command received from the user 290, and/or may automatically change an operation mode of a portion of the plurality of components based on a predetermined value.

In addition, the processor 200 may be implemented in a power meter 210. The processor 200 may measure DVFS characteristics of the plurality of components and determine parameters for controlling the plurality of components based on the measured DVFS characteristics.

The processor 200 may measure performance and power characteristics of the plurality of components and may control operation voltages and operation frequencies of the plurality of components based on the performance and power characteristics.

The processor 200 may adjust power and performance of the plurality of components constituting the computing system. The processor 200 may analyze DVFS characteristics and temperatures of the plurality of components and may determine an optimal operation voltage and an optimal operation frequency for processing a workload.

The processor 200 may acquire a peak performance or power efficiency according to a temperature, a voltage, a frequency, and power of the plurality of components through a micro-benchmark test. The processor 200 may store the acquired peak performance or the acquired power efficiency according to the temperature, the voltage, the frequency, and the power in the form of a table or JavaScript object notation (JSON), in a memory (e.g., the memory 300 of FIG. 1).

The processor 200 may adjust the performance and/or power efficiency of the computing system according to the stored peak performance and/or the stored power efficiency according to the temperature, the voltage, the frequency, and the power. When an amount of data acquired increases, a peak performance, a peak efficiency, a probability of achieving the peak performance, and/or a probability of achieving the peak efficiency may increase.

The processor 200 may apply a low voltage to a component having a relatively high quality to achieve a highest performance among performances that other components may achieve. The processor 200 may set an optimal voltage or an optimal power level every time an operation is changed using the above characteristics.

The processor 200 may determine in advance an optimal voltage or a power level of each of the plurality of components, and may determine a parameter for achieving an optimal power efficiency based on a sum of power or a performance consumed by all components.

The processor 200 may identify a processing time of a workload by adjusting a mean time between failures (MTBF) indicating a range of a normal operation. When the MTBF is reduced, the processor 200 may determine whether the MTBF is less than an expected time of a current workload. When the MTBF is less than an execution time of a workload, the processor 200 may increase the MTBF by adjusting a temperature or increasing an operation voltage.

When a condition in which a plurality of components exhibit an optimal performance, a margin, or a condition in which the components exhibit an optimal power efficiency changes due to an aging effect, the processor 200 may guarantee a normal operation of the computing system by tracking the change.

When a result (e.g., a performance or power efficiency) of a condition is changed in some components due to the aging effect, the processor 200 may predict a performance or power efficiency through regression and may apply a new parameter to all components.

An input value for a regression analysis may include a temperature, a voltage, an operation frequency, an operation power, a size of input data, a shape of input data, a variation in an operation voltage, a variation in a voltage based on a temperature, a variation in a voltage based on an operation frequency, and/or a time used for a change.

The processor 200 may change a method of controlling the computing system according to the high performance mode or the high efficiency mode.

When the operation mode is the high performance mode, the processor 200 may compare power consumption of the plurality of components, and the processor 200 may assign different workloads to the plurality of components based on a result of the comparing of the power consumption.

The plurality of components may include a first component and a second component. The different workloads or the distributed workload may include a first workload, and a second workload with an amount of computation greater than that of the first workload.

For example, when power consumption of the first component is greater than that of the second component, the processor 200 may assign the first workload to the first component, and the processor 200 may assign the second workload to the second component.

For example, in the high performance mode, the computing system may process the workload using two or more communication components (e.g., a network switch or an NIC) and a storage component (e.g., a DRAM, an SSD, or an HDD). Here, when a size (or an amount of computation) of a workload assigned to an operation component or a server including each component is not uniform, the processor 200 may assign a relatively large workload to a component that consumes a relatively small amount of power at the same operation frequency. The processor 200 may assign a relatively small workload to a component that consumes a relatively large amount of power at the same operation frequency. To this end, the processor 200 may determine a parameter by setting the parameter closest to a setting of a parameter that may achieve the peak efficiency in a range that does not have a negative influence on an overall performance. The processor 200 of one or more embodiments may enhance the performance while reducing power consumption of the computing system, by determining a parameter such as an operation voltage, an operation frequency, and/or an operation power. Even when different operation components (e.g., a CPU and a GPU) operate together, the processor 200 may set an operation voltage and/or an operation frequency of a non-critical operation component to maximize the power efficiency.

When the operation mode is the high efficiency mode, the processor 200 may compare operation voltages according to operation frequencies of the plurality of components, and the processor 200 may assign different workloads to the plurality of components based on a result of the comparing of the operation voltages.

When an operation voltage of the first component is less than that of the second component at the same operation frequency, the processor 200 may assign the second workload to the first component, and the processor 200 may assign the first workload to the second component.

In an operation using two or more communication components, an operation component, or a storage component, a size of a workload assigned to each component may not be uniform. The processor 200 may assign a relatively large workload to a component that may further lower the operation voltage at the same operation frequency. The processor 200 of one or more embodiments may control a component in a condition with a highest power efficiency by reducing or increasing the operation frequency within a range that does not have an influence on the performance, to maximize the total power efficiency of the computing system.

The processor 200 may generate a type of an operation and a temperature obtained from one component in the form of a characteristic table. The processor 200 may search for a characteristic of another component of the same type, using the characteristic table.

An arbitrary component may expand a search space starting from a parameter that achieves the maximum performance or a parameter that achieves the maximum efficiency, and accordingly the processor 200 may determine a parameter for optimizing the computing system, instead of onerously searching for the entire search space.

FIG. 5 illustrates an example of a computing system control method of a computing system control apparatus (e.g., the computing system control apparatus 10 of FIG. 1).

Referring to FIG. 5, a processor (e.g., the processor 200 of FIG. 1) may generate a cluster by clustering components of a computing system. The processor 200 may form clusters to separately operate a cluster including components having good DVFS characteristics and a cluster including components having poor DVFS characteristics. Accordingly, the processor 200 of one or more embodiments may more frequently use, or distribute a workload to, a cluster having good DVFS characteristics to reduce power consumption.

The computing system may include a plurality of switches 531, 533, and 535, and a plurality of servers 551, 553, 555, and 557. A computing system control apparatus (e.g., the computing system control apparatus 10 of FIG. 1) may be implemented in a control server 510.

The processor 200 may generate a first cluster and a second cluster by clustering the plurality of components based on DVFS characteristics of the plurality of components. A cluster may be a set of components including a plurality of components.

In the example of FIG. 5, the processor 200 may generate the first cluster by clustering the servers 551 and 553 having relatively good DVFS characteristics. The processor 200 may generate the second cluster by clustering the servers 555 and 557 having relatively poor DVFS characteristics. For example, each of the servers 551 and 553 may have measured or determined DVFS characteristics of greater value than measured or determined DVFS characteristics of each of the servers 555 and 557.

The processor 200 may assign the second workload to a cluster excellent in DVFS characteristics among the first cluster and the second cluster. For example, the processor 200 may assign the second workload that is a relatively large workload to the first cluster, and assign a first workload that is a relatively small workload to the other cluster, that is, the second cluster.

The processor 200 may form a cluster (e.g., a rack or a pod) by clustering components having good DVFS characteristics, to control the computing system so that the formed cluster may achieve a maximum performance with low power consumption. Thus, the processor 200 of one or more embodiments may reduce a total overall computing cost.

FIG. 6 illustrates another example of a computing system control method of a computing system control apparatus (e.g., the computing system control apparatus 10 of FIG. 1).

Referring to FIG. 6, a processor (e.g., the processor 200 of FIG. 1) may generate a cluster by evenly mixing components having good DVFS characteristics and components having poor DVFS characteristics. Accordingly, the processor 200 may maintain performances of clusters as uniform as possible.

A computing system may include a plurality of switches 631, 633, and 635, and a plurality of servers 651, 653, 655, and 657. A computing system control apparatus (e.g., the computing system control apparatus 10 of FIG. 1) may be implemented in a control server 610.

For a management of the computing system, constant performances of the clusters may be maintained. The processor 200 may form a cluster by mixing components with good DVFS characteristics and components with poor DVFS characteristics. Accordingly, power consumed by each cluster may be be similar, and thus a load of a power network and a variation occurring when a workload performance is measured may be reduced.

In other words, the processor 200 may configure the plurality of servers 651, 653, 655, and 657 such that the DVFS characteristics may be evenly distributed. The processor 200 of one or more embodiments may perform clustering to reduce a deviation between DVFS characteristics, such that a user of the computing system may be provided with computing performance of a predetermined level or greater instead of onerously sensing a difference in hardware performance.

FIG. 7 illustrates an example of an operation of controlling a computing system based on a table including parameters.

Referring to FIG. 7, a processor (e.g., the processor 200 of FIG. 1 and/or the CPU 710) of a computing system control apparatus (e.g., the computing system control apparatus 10) of FIG. 1 may determine parameters for controlling the computing system. The processor 200 may store parameters in the form of a table. The computing system control apparatus may include the CPU 710, DRAM 730, GPU 750, and SSD 770. The computing system control apparatus may communicate with a switch 790.

The processor 200 may reduce power consumption while correcting a table associated with unique operation voltages and operation frequencies of a plurality of components constituting the computing system based on temperature values.

The processor 200 may reduce a secured margin by finely adjusting an operation voltage, an operation frequency, or a power value calculated based on a DVFS table stored in a memory (e.g., the memory 300 of FIG. 1).

The processor 200 may store maximum times during which an operation is performed together for each setting condition, to determine an occurrence of an error due to an MTBF. When a failure caused by the MTBF occurs, the processor 200 may store a value indicating that a set value is not valid, together with each set value.

The processor 200 may store a relationship among an operation voltage, an operation frequency, a temperature and an MTBF while periodically monitoring the relationship.

When a result (e.g., performance or a power efficiency) according to a parameter changes due to an aging effect of components, the processor 200 may predict a new result through a regression analysis and apply a changed parameter to all the components. An input to the regression analysis may include a temperature, a voltage, a frequency, power, an input size, an input shape, a variation in a result with respect to a temperature, a variation in a result with respect to a voltage, a variation in a voltage with respect to a temperature, a variation in a voltage with respect to a frequency, and/or an amount of time for a change.

The processor 200 may use a parameter for achieving a maximum performance and a maximum efficiency obtained from one component to search for a parameter for achieving a maximum performance and a maximum efficiency of another component. The processor 200 may search for the parameter for achieving the maximum performance and the maximum efficiency of the other component while changing an operation voltage, an operation frequency, or power obtained from the one component at regular intervals.

In some applications (e.g., high-performance linpack (HPL)), a size of a workload assigned to an operation component may decrease over time. The processor 200 may recognize a size and a shape of a workload that is to be processed before an operation. Here, the processor 200 may set a parameter for achieving a maximum performance suitable for a newly assigned workload by changing an operation voltage, an operation frequency, or power, and may start an operation.

When an operation to be performed is a memory-bound operation with a low arithmetic intensity (AI) or a low operational intensity (OI) of a workload, the processor 200 of one or more embodiments may lower clock frequencies of operation components and clock frequencies of storage components to enhance the performance of the computing system.

FIG. 8 illustrates an example of an operation of controlling a computing system based on reinforcement learning.

When a number of operation components (e.g., GPUs) increases, it may be difficult to test cases corresponding to all parameters in reality. A processor (e.g., the processor 200 of FIG. 1) may store information on a performance and a power efficiency of the computing system in a memory (e.g., the memory 300 of FIG. 1). The processor 200 may store information on manufacturing dates and manufacturers of a plurality of components together with data measured while changing a plurality of conditions (e.g., a data size, a data shape, a temperature, a voltage, a frequency, or power).

The processor 200 may use the stored data as an input, may set setting values of the plurality of components according to an operation mode as target values, and may determine a parameter even for a condition in which a test fails to be performed through a regression scheme of machine learning.

The processor 200 may search for an operation voltage, an operation frequency, or power characteristics while adjusting a temperature within a temperature range (e.g., a range between a lowest temperature allowed by a chip and a highest temperature allowed by the chip) allowed by the chip in a computing system including a number of components less than or equal to a predetermined number, using a scheme of storing parameters in the form of a table.

The processor 200 may determine a parameter using reinforcement learning for a computing system including a number of components greater than or equal to a predetermined number. The processor 200 may determine parameters corresponding to a high performance mode and a high efficiency mode by performing reinforcement learning on a neural network. The processor 200 of one or more embodiments may optimize the performance or the power efficiency of the computing system by applying the determined parameters to different components, even though a large number of tests are not performed.

The processor 200 may extract a state and a reward from an environment 830 in response to an action of an agent 810. The processor 200 may adjust a parameter assigned to the agent 810 by changing the reward. The reward may include a reciprocal of a difference between an optimal condition and a current condition.

The processor 200 may adjust an operation voltage, an operation frequency, and/or power of the agent 810 based on the extracted state and the extracted reward. The state may include an operation voltage, an operation frequency, or a temperature, which is adjusted.

In the high performance mode, when an arbitrary workload is executed, a size and a shape of input data assigned to each component may change over time. The processor 200 of one or more embodiments may set a maximum operation frequency to maximize the performance of the computing system. When maximizing of the performance succeeds while reducing an operation voltage or power, the processor 200 may perform learning by increasing the reward. The processor 200 may set a reward of a point corresponding to a lowest operation voltage or lowest power as a maximum reward in a maximum operation frequency condition, and may assign the reward in proportion to the set operation frequency, the set operation voltage or a difference between a power condition and a measured condition.

The processor 200 may control the agent 810 to prevent the agent 810 from deviating from a provided range, by assigning a lowest reward to a condition that is out of a predetermined range.

In the high efficiency mode, when a predetermined workload is executed, a size and a shape of input data assigned to a component may change over time. The processor 200 may adjust the operation voltage and the operation frequency so as to maximize the power efficiency. Accordingly, when a high power efficiency value (e.g., TFLOPS/W) is measured, the processor 200 may perform learning by increasing a reward.

FIGS. 9A through 9C illustrate examples of hardware in which a computing system control apparatus (e.g., the computing system control apparatus 10 of FIG. 1) may be implemented. FIG. 9A illustrates a server managed by a single operating system (OS), FIG. 9B illustrates a rack or cluster that is a set of servers, and FIG. 9C illustrates a hardware accelerator that may be included in a server.

A computing system control apparatus (e.g., the computing system control apparatus 10 of FIG. 1) may be implemented on a variety of hardware.

The computing system control apparatus 10 may be applied to a computing system, for example, an Internet of things (IoT), an autonomous system, a GPU server, a high performance computing (HPC), a cloud, or a supercomputer, to achieve a maximum performance while reducing power consumption.

FIG. 10 illustrates an example of an operation of a computing system control apparatus (e.g., the computing system control apparatus 10 of FIG. 1). Operations 1010 through 1070 to be described hereinafter may be performed in sequential order, but may not be necessarily performed in sequential order. For example, the operations 1010 through 1070 may be performed in different orders, and at least two of the operations 1010 through 1070 may be performed in parallel or simultaneously. Further, one or more of operations 1010 through 1070 may be omitted, without departing from the spirit and scope of the shown example. The operations 1010 through 1070 to be described hereinafter with reference to FIG. 10 may be performed by one or more components (e.g., the processor 200 of FIG. 1) of an electronic device (e.g., the computing system control apparatus 10 of FIG. 1) described herein, and in addition to the description of FIG. 10 below, the descriptions of FIGS. 1 through 9 are also applicable to FIG. 10 and are incorporated herein by reference.

Referring to FIG. 10, in operation 1010, a receiver (e.g., the receiver 100 of FIG. 1) may receive an operation mode for controlling a plurality of components constituting a computing system. The operation mode may include a high performance mode and/or a high efficiency mode.

In operation 1030, the processor 200 may determine a parameter for controlling the plurality of components based on the operation mode, a time limit for processing an operation, and an operation time of the plurality of components.

The receiver 100 may receive a command to change the operation mode from a user of the computing system in real time. The processor 200 may change an operation mode of a portion of the plurality of components in response to the command received from the user. Alternatively or additionally, the processor 200 may automatically change an operation mode of a portion of the plurality of components based on a predetermined value.

The processor 200 may determine an operation voltage and an operation frequency for controlling the plurality of components based on the operation mode, the time limit for processing an operation, and the operation time of the plurality of components.

The processor 200 may determine a parameter based on power consumed by the plurality of components, performances of the plurality of components, and temperatures of the plurality of components.

The processor 200 may determine parameters by performing reinforcement learning on a neural network based on temperatures of the plurality of components, operation voltages of the plurality of components, operation frequencies of the plurality of components, power consumption of the plurality of components, peak performances of the plurality of components, and power efficiencies of the plurality of components.

In operation 1050, the processor 200 may distribute a workload for the plurality of components based on the parameter.

When the operation mode is the high performance mode, the processor 200 may compare power consumption of the plurality of components, and the processor 200 may assign different workloads to the plurality of components based on a comparison result of the power consumption.

The plurality of components may include a first component and a second component. The different workloads or the distributed workload may include a first workload, and a second workload with an amount of computation greater than that of the first workload.

When power consumption of the first component is greater than that of the second component, the processor 200 may assign the first workload to the first component, and the processor 200 may assign the second workload to the second component.

When the operation mode is the high efficiency mode, the processor 200 may compare operation voltages according to operation frequencies of the plurality of components, and the processor 200 may assign different workloads to the plurality of components based on a comparison result of the operation voltages.

When an operation voltage of the first component is less than that of the second component at the same operation frequency, the processor 200 may assign the second workload to the first component, and the processor 200 may assign the first workload to the second component.

The processor 200 may generate a first cluster and a second cluster by clustering the plurality of components based on DVFS characteristics of the plurality of components. A cluster may be a set of components including a plurality of components.

The processor 200 may assign the second workload to a cluster excellent in DVFS characteristics among the first cluster and the second cluster. The processor 200 may assign the first workload to the other cluster.

In operation 1070, the processor 200 may process an operation based on the distributed workload.

The computing system control apparatuses, receivers, processors, memories, power meters, servers, switches, control server, environments, agents, computing system control apparatus 10, receiver 100, processor 200, memory 300, power meter 210, servers 230, 271, 273, 275, and 277, switches 251, 253, and 255, control server 510, switches 531, 533, and 535, servers 551, 553, 555, and 557, control server 610, switches 631, 633, and 635, servers 651, 653, 655, and 657, environment 830, agent 810, and other apparatuses, units, modules, devices, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus with computing system control, the apparatus comprising:

a processor configured to:

determine one or more parameters for controlling a plurality of components constituting a computing system based on whether an operation mode for controlling the plurality of components is a high performance mode or a high efficiency mode and on an operation time to complete processing of one or more workloads using the plurality of components, and by performing reinforcement learning on a neural network based on temperatures of the plurality of components, operation voltages of the plurality of components, operation frequencies of the plurality of components, power consumptions of the plurality of components, peak performances of the plurality of components, and power efficiencies of the plurality of components;

in response to the operation mode being the high performance mode, compare the power consumptions of the plurality of components;

in response to the operation mode being the high efficiency mode, compare the operation voltages according to the operation frequencies of the plurality of components;

distribute the one or more workloads to the plurality of components based on the one or more parameters and on a result of the comparing of the power consumptions or a result of the comparing of the operation voltages according to the operation mode; and process the distributed one or more workloads on the plurality of components.

2. The apparatus of claim 1, wherein, for the determining of the one or more parameters, the processor is configured to:

determine the one or more parameters for controlling the plurality of components based on the operation mode being the high performance mode; and determine the one or more parameters for controlling the plurality of components based on the operation mode being the high efficiency mode.

3. The apparatus of claim 1, wherein the plurality of components comprises any one or any combination of any two or more of an operation component, a storage component, a communication component, and a power component.

4. The apparatus of claim 1, wherein, for the determining of the one or more parameters, the processor is configured to determine either one or both of an operation voltage and an operation frequency for controlling the plurality of components based on the operation mode and the operation time of the plurality of components.

5. The apparatus of claim 1, wherein, for the determining of the one or more parameters, the processor is configured to determine the one or more parameters based on the power consumptions of the plurality of components, performances of the plurality of components, and the temperatures of the plurality of components.

6. The apparatus of claim 1, wherein, for the distributing of the one or more workloads, the processor is configured to, in response to the operation mode being the high performance mode:

assign different workloads of the one or more workloads to the plurality of components based on the result of the comparing of the power consumption.

7. The apparatus of claim 1, wherein for the determining of the one or more parameters, the processor is configured to perform either one of:

changing an operation mode of a portion of the plurality of components in response to a command to change the operation mode from a user of the computing system in real time; and automatically changing an operation mode of a portion of the plurality of components based on a predetermined value.

8. The apparatus of claim 6, wherein the plurality of components comprises a first component and a second component, the different workloads comprise a first workload, and a second workload having an amount of computation greater than an amount of computation of the first workload, and for the assigning of the different workloads, the processor is configured to, in response to power consumption of the first component being greater than power consumption of the second component:

assign the first workload to the first component; and assign the second workload to the second component.

9. The apparatus of claim 1, wherein, for the distributing of the one or more workloads, the processor is configured to, in response to the operation mode being the high efficiency mode:

assign different workloads of the one or more workloads to the plurality of components based on a result of the comparing of the operation voltages.

10. The apparatus of claim 9, wherein the plurality of components comprises a first component and a second component, the different workloads comprise a first workload, and a second workload with an amount of computation greater than an amount of computation of the first workload, and for the assigning of the different workloads, the processor is configured to, in response to an operation voltage of the first component being less than an operation voltage of the second component at a same operation frequency:

assign the second workload to the first component; and assign the first workload to the second component.

11. The apparatus of claim 1, wherein the distributed workload comprises a first workload, and a second workload with an amount of computation greater than an amount of computation of the first workload, and for the distributing of the workload, the processor is configured to:

generate a first cluster and a second cluster by clustering the plurality of components based on dynamic voltage and frequency scaling (DVFS) characteristics of the plurality of components;

assign the second workload to a cluster excellent in the DVFS characteristics among the first cluster and the second cluster; and assign the first workload to the other cluster.

12. A processor-implemented method with computing system control, the method comprising:

receiving an operation mode for controlling a plurality of components constituting a computing system;

determining one or more parameters for controlling the plurality of components based on whether the operation mode is a high performance mode or a high efficiency mode and on an operation time to complete processing of one or more workloads using the plurality of components, and by performing reinforcement learning on a neural network based on temperatures of the plurality of components, operation voltages of the plurality of components, operation frequencies of the plurality of components, power consumptions of the plurality of components, peak performances of the plurality of components, and power efficiencies of the plurality of components;

in response to the operation mode being the high performance mode, comparing the power consumptions of the plurality of components;

in response to the operation mode being the high efficiency mode, comparing the operation voltages according to the operation frequencies of the plurality of components;

distributing the one or more workloads to the plurality of components based on the one or more parameters and on a result of the comparing of the power consumptions or a result of the comparing of the operation voltages according to the operation mode; and processing the distributed one or more workloads on the plurality of components.

13. The method of claim 12, wherein the determining of the one or more parameters comprises selectively, based on the received operation mode:

determining the one or more parameters for controlling the plurality of components based on the operation mode being the high performance mode; and determining the one or more parameters for controlling the plurality of components based on the operation mode being the high efficiency mode.

14. The method of claim 12, wherein the plurality of components comprises any one or any combination of any two or more of an operation component, a storage component, a communication component, and a power component.

15. The method of claim 12, wherein the determining of the one or more parameters comprises determining either one or both of an operation voltage and an operation frequency for controlling the plurality of components based on the operation mode and the operation time of the plurality of components.

16. The method of claim 12, wherein the determining of the one or more parameters comprises determining the one or more parameters based on the power consumptions of the plurality of components, performances of the plurality of components, and the temperatures of the plurality of components.

17. The method of claim 12, wherein the distributing of the one or more workloads comprises, in response to the operation mode being the high performance mode:

assigning different workloads of the one or more workloads to the plurality of components based on a result of the comparing of the power consumptions.

18. The method of claim 12, wherein the receiving of the operation mode comprises receiving a command to change the operation mode from a user of the computing system in real time, and the determining of the one or more parameters comprises either one of:

changing an operation mode of a portion of the plurality of components in response to the command; and automatically changing an operation mode of a portion of the plurality of components based on a predetermined value.

19. The method of claim 17, wherein the plurality of components comprises a first component and a second component, the different workloads comprise a first workload, and a second workload having an amount of computation greater than an amount of computation of the first workload, and the assigning of the different workloads to the plurality of components comprises, in response to power consumption of the first component being greater than power consumption of the second component:

assigning the first workload to the first component; and assigning the second workload to the second component.

20. The method of claim 12, wherein the distributing of the one or more workloads comprises, in response to the operation mode being the high efficiency mode:

assigning different workloads of the one or more workloads to the plurality of components based on the result of the comparing of the operation voltages.

21. The method of claim 20, wherein the plurality of components comprises a first component and a second component, the different workloads comprise a first workload, and a second workload having an amount of computation greater than an amount of computation of the first workload, and the assigning of the different workloads to the plurality of components comprises, in response to an operation voltage of the first component being less than an operation voltage of the second component at a same operation frequency:

assigning the second workload to the first component; and assigning the first workload to the second component.

22. The method of claim 12, wherein the distributed workload comprises a first workload, and a second workload with an amount of computation greater than an amount of computation of the first workload, and the distributing of the workload comprises:

generating a first cluster and a second cluster by clustering the plurality of components based on dynamic voltage and frequency scaling (DVFS) characteristics of the plurality of components;

assigning the second workload to a cluster excellent in the DVFS characteristics among the first cluster and the second cluster; and assigning the first workload to the other cluster.

23. A non-transitory computer-readable storage medium storing instructions that, when executed by a processor, configure the processor to perform the method of claim 12.

24. A processor-implemented method with computing system control, the method comprising:

determining a first operation parameter of a first component and a second operation parameter of a second component based on whether an operation mode for controlling a computing system comprising the first component and the second component is a high performance mode or a high efficiency mode, and by performing reinforcement learning on a neural network based on temperatures of the first and second components, operation voltages of the first and second components, operation frequencies of the first and second components, power consumptions of the first and second components, peak performances of the first and second components, and power efficiencies of the first and second components;

in response to the operation mode being the high performance mode, comparing the power consumptions of the first and second components;

in response to the operation mode being the high efficiency mode, comparing the operation voltages according to the operation frequencies of the first and second components;

based on a comparison result of the power consumptions or a comparison result of the operation voltages, assigning a first workload to the first component and a second workload, having a greater amount of computation than the first workload, to the second component, in response to a value of the first operation parameter being greater than a value of the second operation parameter according to the operation mode; and processing the first workload the second workload using the first component and the second component based on the assigned first workload and the assigned second workload on the plurality of components.

25. The method of claim 24, wherein the determining of the first operation parameter and the second operation parameter comprises:

determining the first operation parameter and the second operation parameter to be power consumptions in response to the operation mode being the high performance mode; and determining the first operation parameter and the second operation parameter to be operation voltages in response to the operation mode being the high efficiency mode.

* * * * *